(12) United States Patent
Grady

(10) Patent No.: US 6,545,441 B1
(45) Date of Patent: Apr. 8, 2003

(54) ACTUATOR FOR DRIVING A DRIVEN MEMBER

(75) Inventor: Kevin Grady, Plymouth Township, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/224,757

(22) Filed: Aug. 21, 2002

(51) Int. Cl.[7] .................................................. G05B 1/06
(52) U.S. Cl. ........................ 318/666; 318/560; 318/671
(58) Field of Search ................... 318/666, 560, 318/671

(56) References Cited

U.S. PATENT DOCUMENTS

| | | | | |
|---|---|---|---|---|
| 3,580,241 A | * | 5/1971 | Weinstein | 600/523 |
| 3,617,849 A | | 11/1971 | Charlton | 318/616 |
| 3,652,913 A | * | 3/1972 | Leland | 318/678 |
| 3,742,327 A | * | 6/1973 | Nettles | 318/678 |
| 4,070,610 A | | 1/1978 | Rudich, Jr. | 318/678 |
| 4,185,575 A | * | 1/1980 | Brown et al. | 112/277 |
| 4,262,521 A | * | 4/1981 | Beck | 374/23 |
| 4,388,571 A | | 6/1983 | Tad et al. | 318/293 |
| 4,767,974 A | | 8/1988 | Kadasawa | 318/663 |
| 5,389,864 A | * | 2/1995 | Tryan et al. | 318/562 |
| 5,666,036 A | | 9/1997 | Swanson | 318/295 |
| 5,744,925 A | | 4/1998 | Madsen | 318/590 |
| 5,971,549 A | * | 10/1999 | Cruickshank | 359/843 |

\* cited by examiner

*Primary Examiner*—Rita Leykin
(74) *Attorney, Agent, or Firm*—Brinks Hofer Gilson & Lione

(57) ABSTRACT

An actuator system having a controller, a motor, and a feedback device, wherein an output shaft of the motor is connected to the feedback device. The controller directs the application of power to the motor and the feedback device produces a signal indicative of the position of the output shaft. Advantageously, the signal may be read by the controller when the motor is not in motion.

30 Claims, 6 Drawing Sheets

ACTUATOR FOR DRIVING A DRIVEN MEMBER

TECHNICAL FIELD

This invention relates to actuator systems of the type having a motor and a feedback device when the feedback device is connected to an output shaft of the motor.

BACKGROUND

Actuator systems are used for driving a driven member in a wide variety of applications. By way of example, actuators are used in automotive climate controls to adjust the various air duct doors. Further, these doors are used to blend heated, cooled or ambient air according to a selected temperature setting and to direct the air to the selected vents.

Actuators are generally part of a control system that accepts instructions from a user and directs the movement of the actuators according to those instructions. The control system often needs to have information regarding the current position of the output shaft of the motor. The position of the output shaft is provided by the feedback device. The feedback device may be a potentiometer having a wiper that is mechanically coupled and driven by the output shaft of the motor.

As shown in FIG. 1A, earlier prior art solutions utilized a five-wire actuator system. Typical applications have a processor (not shown), two motor drivers (not shown) and an analog-to-digital converter (not shown). A motor 10 is connected to the two drivers through a first port 12 and a fifth port 20. It will be understood that the motor has an output shaft connected to the device to be driven. The output shaft also carries a wiper 22 of a potentiometer 24. Wiper 22 is connected to the analog-to-digital converter through a third port 16. A power supply (not shown) is connected to one side of potentiometer 24 through a second port 14 while the other side is grounded through a fourth port 18. A motor power supply (not shown) is connected to the two motor drivers.

In this system, five wires are needed to connect motor 10 and potentiometer 24 to first port 12, second port 14, third port 16, fourth port 18, and fifth port 20. The output voltage of third port 16 is proportional to a position of the output shaft. Note that potentiometer 24 requires a potentiometer power supply (not shown), separate from the power supply. The potentiometer power supply and its associated wiring add cost and complexity to the system. The three-wire and four-wire systems of the present invention have been developed to minimize these costs.

While the device of U.S. Pat. No. 5,389,864 issued to Tryan et al, achieves its intended purpose of eliminating the potentiometer power supply, significant disadvantages still exist. As shown in FIG. 1B, the actuator system consists of a first port 26, a second port 28, a third port 30, a motor 32, and a potentiometer 34. First port 26 and third port 30 connect a power supply (not shown) to motor 32 and potentiometer 34. Second port 28 is connected to an analog-to-digital converter (not shown) with the purpose of providing a voltage indicative of the position of the output shaft, The disadvantages of this system are that second port 28 will only provide voltage indicative of the position of the output shaft when motor 32 is powered by the power supply. To solve this problem, a short pulse must be produced by the power supply long enough to produce a voltage indicative of position of the output shaft, but short enough not to move motor 32, which may cause an error in the voltage indicative of the position of the output shaft. Last, complex software must be developed to differentiate which direction motor 32 is moving to correctly interpret the voltage indicative of the position of the output shaft.

Furthermore, in the device disclosed in U.S. Pat. No. 5,744,925 issued to Madsen, achieves its intended purpose of eliminating the potentiometer power supply, however significant disadvantages still exist. As shown in FIG. 1C, the actuator system consists of a first port 36, a second port 38, a motor 40, a potentiometer 42, a resistor 44, a first zener diode 46, and a second zener diode 48. Potentiometer 42 and resistor 44 are connected in series across first port 36 and second port 38 and will produce a voltage indicative of the position of the output shaft when a current passes through potentiometer 42 and resistor 44. Motor 40, first zener diode 46 and second zener diode 48 are connected in series across first port 36 and second port 38. More specifically, first zener diode 46 and second zener diode 48 are connected in a back-to-back configuration. The back-to-back configuration will only allow a flow of current through motor 40 when the voltage across first port 36 and second port 38 reaches a threshold voltage. A voltage reading can be taken across potentiometer 42 and resistor 44 without moving the motor when the voltage across first port 36 and second port 38 is below the threshold voltage. The disadvantages of this system are that a voltage reading across potentiometer 42 and resistor 44 can only be taken when the voltage across first port 36 and second port 38 are below the threshold voltage. Next, motor 40 will need to be a larger motor due to a greater voltage required to exceed the threshold voltage. Last, first zener diode 46 and second zener diode 48 are components that are not commonly found on an actuator and would increase manufacturing costs.

Therefore, there is a need for a new and improved device that allows a reading of the position of the output shaft without requiring the motor to move, does not require a larger, more costly motor, and does not require any components not commonly found on an actuator. At the same time, the device should be less costly than devices currently used.

SUMMARY

In an aspect of the present invention, an actuator and controller is provided. The actuator has a motor and a potentiometer. The motor has an output shaft, a first drive contact and a second drive contact. The potentiometer has a first potentiometer contact, a second potentiometer contact and a potentiometer feedback contact. The first potentiometer contact is connected to one of the first drive contact, the second drive contact and a grounded contact, the second potentiometer contact is connected to the potentiometer feedback contact, thereby producing a feedback signal indicative of a position of the output shaft. The controller has a feedback port, a first motor control port, and a second motor control port. The feedback port is connected to the second potentiometer contact and the potentiometer feedback contact. The first motor control port is connected to the first drive contact and the second motor control port is connected to the second drive contact.

In accordance with another aspect of the present invention, the feedback signal is indicative of an electrical impedance.

In accordance with another aspect of the present invention, the first potentiometer contact is connected to the first drive contact.

In accordance with another aspect of the present invention, the first potentiometer contact is connected to the second drive contact.

In accordance with another aspect of the present invention, the first potentiometer contact is connected to the grounded contact.

In accordance with another aspect of the present invention, the controller further comprises a pull-up resistor connected to the feedback port.

In accordance with another aspect of the present invention, the controller further comprises a pull-down resistor connected to the first motor control port.

In accordance with another aspect of the present invention, the controller further comprises an analog-to-digital converter. The analog-to-digital converter has an analog input and a digital output. The analog input is connected to the feedback port. The digital output is connected to the processor.

In accordance with another aspect of the present invention, the digital-to-analog converter is integrated within the processor.

In accordance with another aspect of the present invention, the controller further comprises a first motor driver and a second motor driver. The first motor driver has a first motor driver output and a first motor driver input and the second motor driver has a second motor driver output and a second motor driver input. The first motor driver output is connected to the first motor control port and a second motor driver output is connected to the second motor control port. The first motor driver input is connected to the processor and the second motor driver input is connected to the processor.

In accordance with another aspect of the present invention, the controller further comprises a differential amplifier. The differential amplifier has a first differential input, a second differential input and a differential output. The first differential input is connected to the feedback port. The second differential input is connected to the second motor control port.

In accordance with another aspect of the present invention, the controller further comprises an analog-to-digital converter. The analog-to-digital converter has an analog input and a digital output. The analog input is connected to the differential output. The digital input is connected to the processor In accordance with another aspect of the present invention, the digital-to-analog converter is integrated within the processor.

These and other aspects and advantages of the present invention will become apparent upon reading the following detailed description of the invention in combination with the accompanying drawings.

DETAILED DESCRIPTION

Figure 1A:
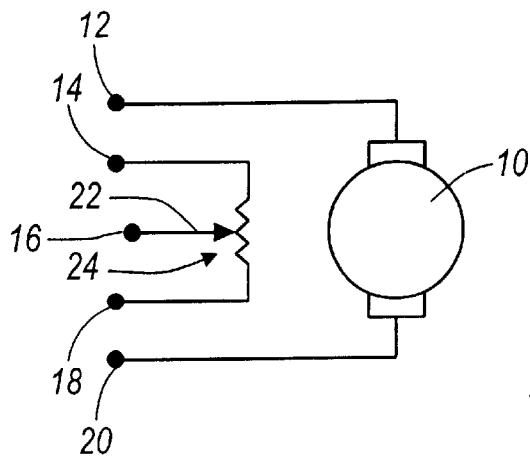
FIG. 1A is a schematic of a five wire actuator, in accordance with the prior art.
Figure 1B:
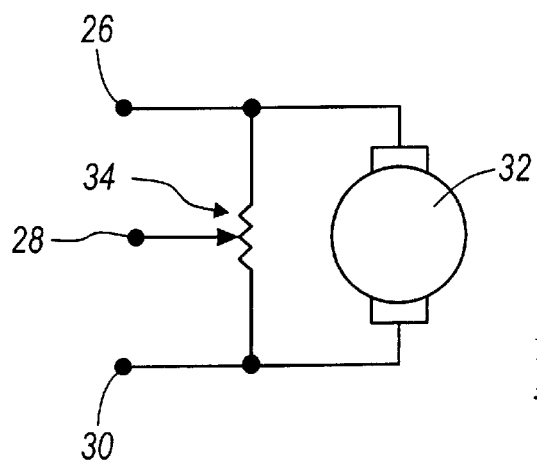
FIG. 1B is a schematic of a three wire actuator, in accordance with the prior art.
Figure 1C:
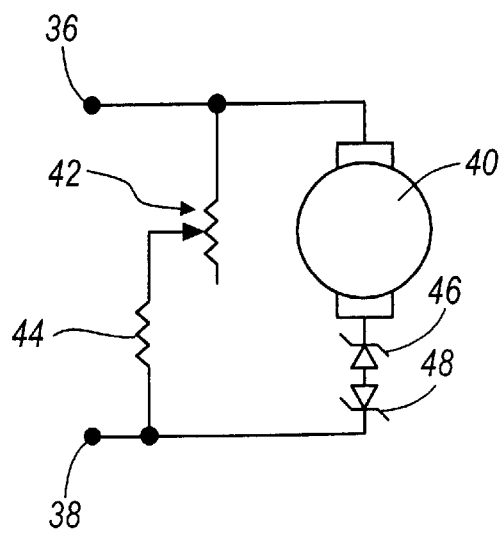
FIG. 1C is a schematic of a two wire actuator, in accordance with the prior art.
Figure 2:
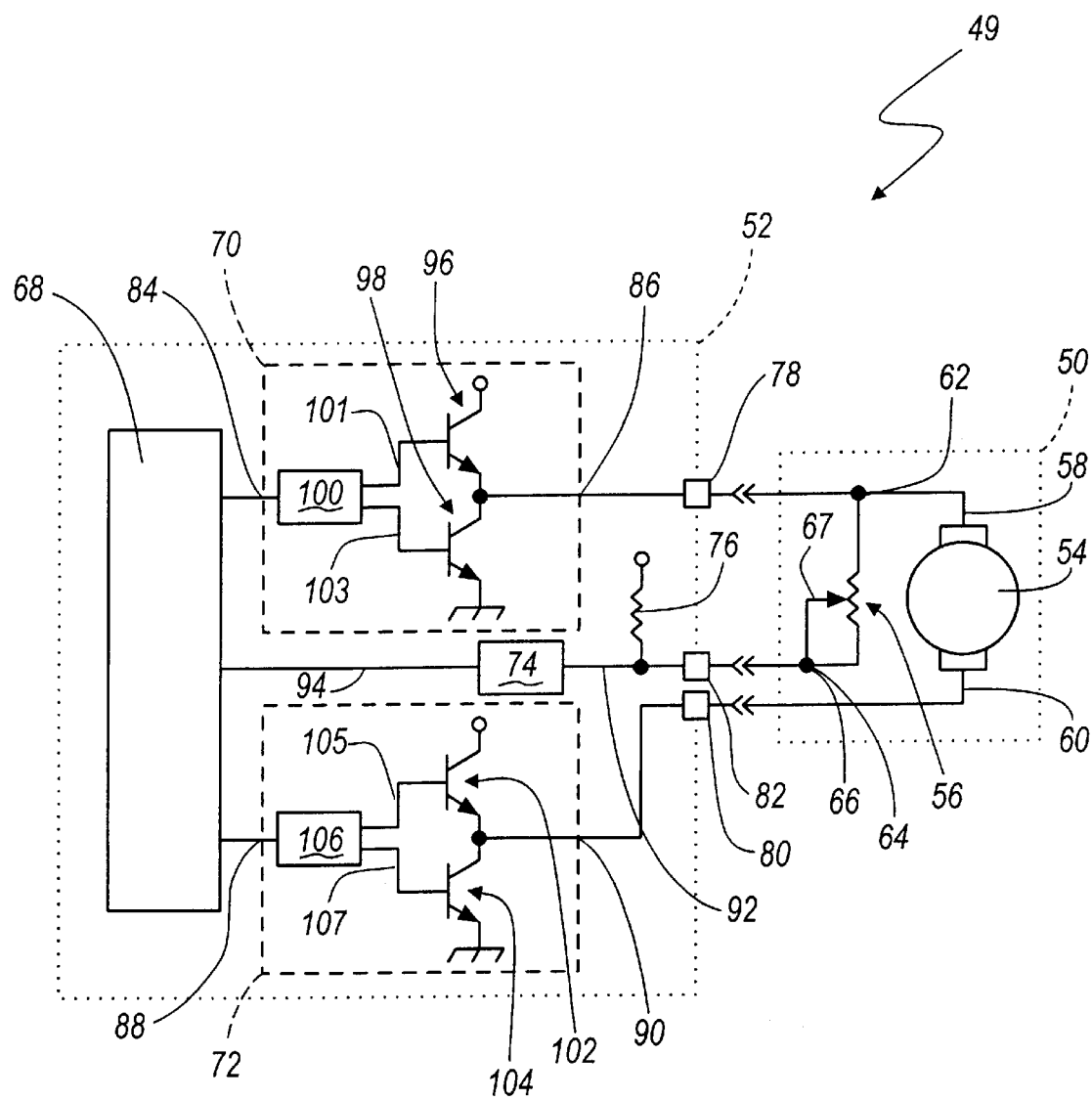
FIG. 2 is a schematic of a controller and an actuator, in accordance with the present invention.

Referring now to FIG. 2, a system 49 having an actuator 50 and a controller 52 is shown, in accordance with the present invention. Actuator 50 includes a motor 54 and a potentiometer 56. Motor 54 has an output shaft (not shown), a stator (not shown), a rotor (not shown), a first drive contact 58, and a second drive contact 60. Actuator 50 may be a Bühler Platform 1.61.072 actuator or similar device. Potentiometer 56 has a first potentiometer contact 62, a second potentiometer contact 64, a potentiometer feedback contact 66 and a wiper 67.

In an embodiment of the present invention, controller 52 includes a processor 68, a first motor driver 70, a second motor driver 72, an analog-to-digital converter 74, a pull-up resistor 76, a first motor control port 78, a second motor control port 80, and a feedback port 82. Processor 68 may be a Motorola 68HC12 or similar device. First motor driver 70 and second motor driver 72 may be a Toshiba TA8083 or similar device. First motor driver 70 has a motor driver input 84 and a motor driver output 86. Second motor driver 72 has a motor driver input 88 and a motor driver output 90. Analog-to-digital converter 74 has an analog input 92 and a digital output 94.

Generally, first motor driver 70 has a first transistor 96, a second transistor 98, and a transistor controller 100. First transistor 96 and second transistor 98 are connected in series in a conventional manner. Transistor controller 100 has a first base control line 101 and a second base control line 103. First base control line 101 is connected to a base of first transistor 96. Second base control line 103 is connected to a base of second transistor 98. The input of first transistor controller 100 is connected to motor driver input 84. An output of first transistor 96 and second transistor 98 is connected to motor driver output 86.

Generally, second motor driver 72 has a first transistor 102, a second transistor 104, and a transistor controller 106. First transistor 102 and second transistor 104 are connected in series in a conventional manner. Transistor controller 106 has a first base control line 105 and a second base control line 107. First base control line 105 is connected to a base of first transistor 102. Second base control line 107 is connected to a base of second transistor 104. The input of first transistor controller 106 is connected to motor driver input 88. An output of first transistor 102 and second transistor 104 is connected to motor driver output 90.

First potentiometer contact 62 is connected to first drive contact 58 and to first motor control port 78. First drive contact 58 is connected to first motor control port 78. Second potentiometer contact 64 is connected to potentiometer feedback contact 66 and to feedback port 82. Second motor drive contact 60 is connected to second motor control port 80. The output shaft of motor 54 is mechanically connected to wiper 67.

Motor driver output 86 is connected to first motor control port 78. Second motor driver output 90 is connected to second motor control port 80. Pull-up resistor 76 is connected to feedback control port 82. Analog input 92 is connected to feedback control port 82. Motor driver input 84 is connected to processor 68. Motor driver input 88 is connected to processor 68. Digital output 94 is connected to processor 68.

To rotate the rotor of motor 54 in a first direction, processor 68 sends a command signal instruction to first motor driver 70 and second motor driver 72 to set first transistor 96 of first motor driver 70 and second transistor 104 of second motor driver 72 in an on position and to set second transistor 98 of first motor driver 70 and first transistor 102 of second motor driver 72 in a off position. Processor 68 communicates the command signals to first motor control driver 70 through first motor driver input 84 and to second motor control driver 72 through second motor driver input 88. First motor driver 70 provides a driving voltage to first drive contact 58 through first motor control port 78. Second motor driver 72 provides a ground for second drive contact 60 through second motor control port 80.

To rotate the rotor of motor 54 in a second direction, processor 68 sends a command signal instruction to first motor driver 70 and second motor driver 72 to set second transistor 98 of first motor driver 70 and first transistor 102 of second motor driver 72 in an on position and to set first transistor 96 of first motor driver 70 and second transistor 104 of second motor driver 72 in a off position. Processor 68 communicates the command signals to first motor control driver 70 through first motor driver input 84 and to second motor control driver 72 through second motor driver input 88. First motor driver 70 provides a ground to first drive contact 58 through first motor control port 78. Second motor driver 72 provides a driving voltage for second drive contact 60 through second motor control port 80.

Generally, when the rotor of motor 54 rotates in the first direction or rotates in the second direction, the output shaft rotates in the same direction as the rotor of motor 54. When the output shaft rotates, wiper 67 swipes across potentiometer 56. Movement of wiper 67 changes an impedance of potentiometer 56. For feedback to occur, processor 68 instructs first motor driver 70 to set second transistor 98 of first motor driver 70 in an on position.

When second transistor 98 of first motor driver 70 is in an on position, a current will flow through pull-up resistor 76 and through potentiometer 56. The current flows from pull-up resistor 76 through potentiometer 56 by way of feedback port 82. A voltage is created at feedback port 82 indicative of a position of the output shaft. The voltage is present at analog input 92. Analog-to-digital converter 74 will convert the voltage into a digital signal indicative of the position of the output shaft. The digital signal will be outputted to digital output 94. The digital signal will be interpreted by processor 68.

Figure 3:
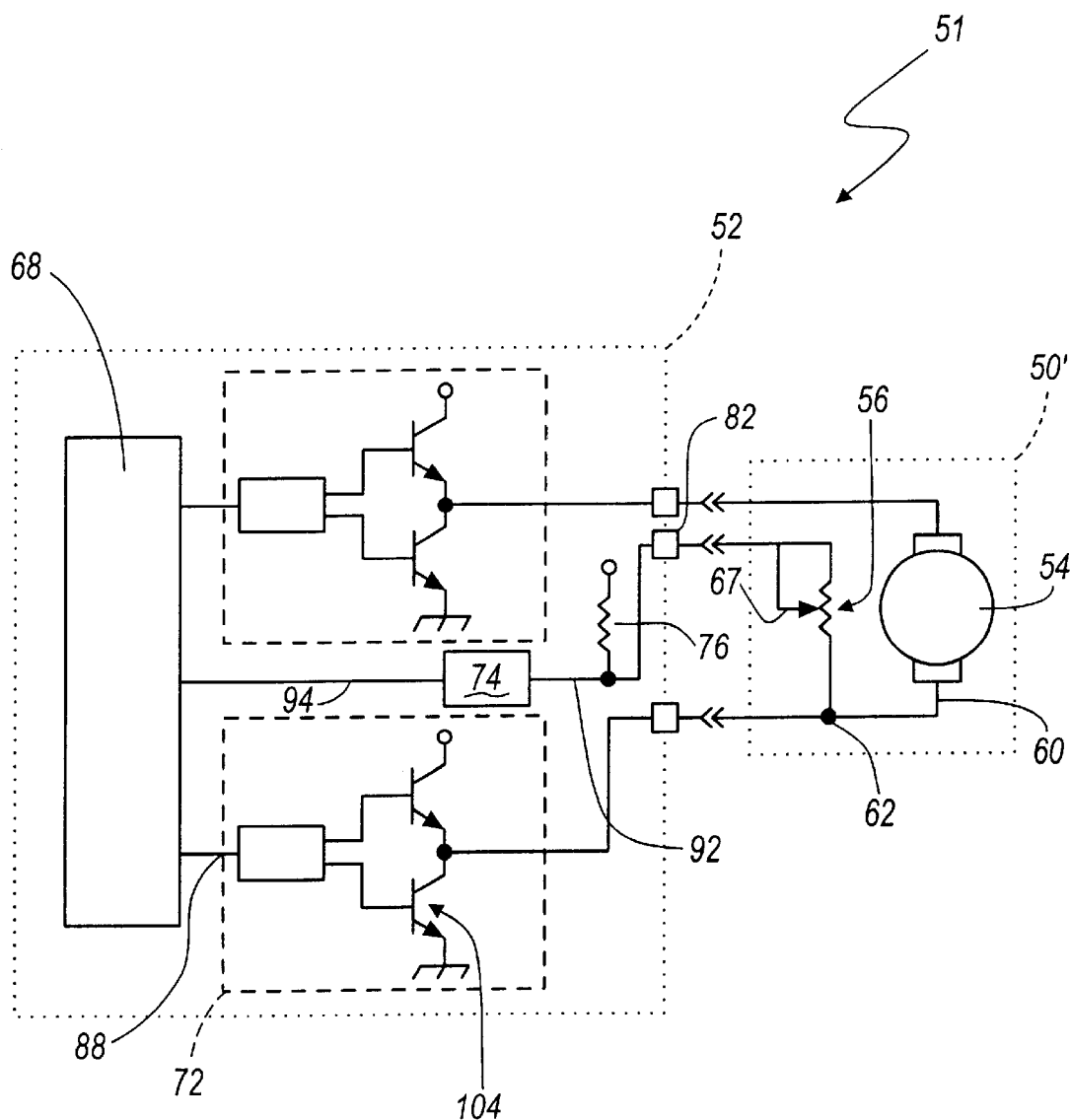
FIG. 3 is a schematic of a controller and an actuator with the potentiometer connected to the second drive contact, in accordance with the present invention.

Referring now to FIG. 3, a system 51 having an actuator 50' and the controller 52 is shown, in accordance with the present invention. First potentiometer contact 62 is connected to second motor drive contact 60. All other elements in this embodiment that are designated by like reference numerals are the same as the embodiment shown in FIG. 2. In this embodiment, to rotate the rotor of motor 54 in the first direction or in the second direction is the same as in the embodiment shown in FIG. 2. When the rotor of motor 54 rotates in the first direction or rotates in the second direction, the output shaft rotates in the same direction as motor 54. When the output shaft rotates, the wiper swipes across potentiometer 56. Movement of wiper 67 changes the impedance of potentiometer 56. For feedback to occur, processor 68 instructs second motor driver 72 to set second transistor 104 in an on position. Processor 68 will communicate with the second motor control driver 72 through second motor driver input 88.

When second transistor 104 of second motor driver 72 is in an on position, a current will flow through pull-up resistor 76 and through potentiometer 56. The current will flow from pull-up resistor 76 through potentiometer 56 by way of feedback port 82. A voltage is present at feedback port 82 indicative of the position of the output shaft. The voltage is received by analog input 92. Analog-to-digital converter 74 will convert the voltage into a digital signal indicative of the position of the output shaft. The digital signal will be outputted to digital output 94. The digital signal will be interpreted by processor 68.

Figure 4:
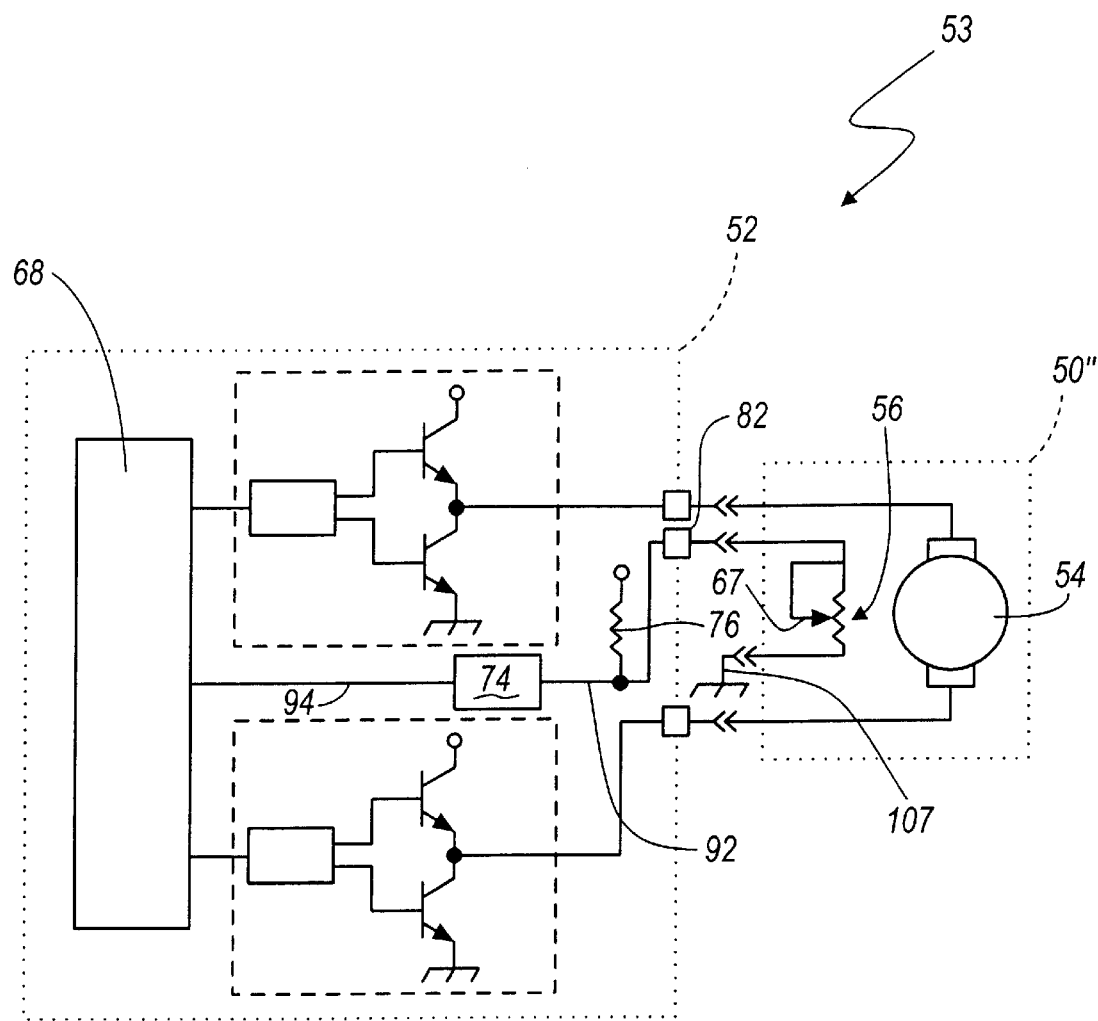
FIG. 4 is a schematic of a controller and an actuator with the potentiometer connected to a grounded contact, in accordance with the present invention.

Referring now to FIG. 4, a system 53 having an actuator 50'' and the controller 52 is shown, in accordance with the present invention. The first potentiometer contact 62 is connected to a grounded contact 107. All other elements having like reference numerals in this embodiment are the same as the embodiment shown in FIG. 2. In this embodiment, to rotate the rotor of motor 54 in the first direction or in the second direction is the same as in the embodiment shown in FIG. 2. When the rotor of motor 54 rotates in the first direction or rotates in the second direction, the output shaft rotates in the same direction as motor 54. When the output shaft rotates, wiper 67 swipes across potentiometer 56. Movement of wiper 67 changes the impedance of potentiometer 56.

For feedback to occur, a current flows through pull-up resistor 76 and through potentiometer 56. The current flows from pull-up resistor 76 through potentiometer 56 by way of feedback port 82. A voltage is developed at feedback port 82 indicative of the position of the output shaft. The voltage is present at analog input 92. Analog-to-digital converter 74 will convert the voltage into a digital signal indicative of the position of the output shaft. The digital signal will be outputted to digital output 94. The digital signal will be interpreted by processor 68.

Figure 5:
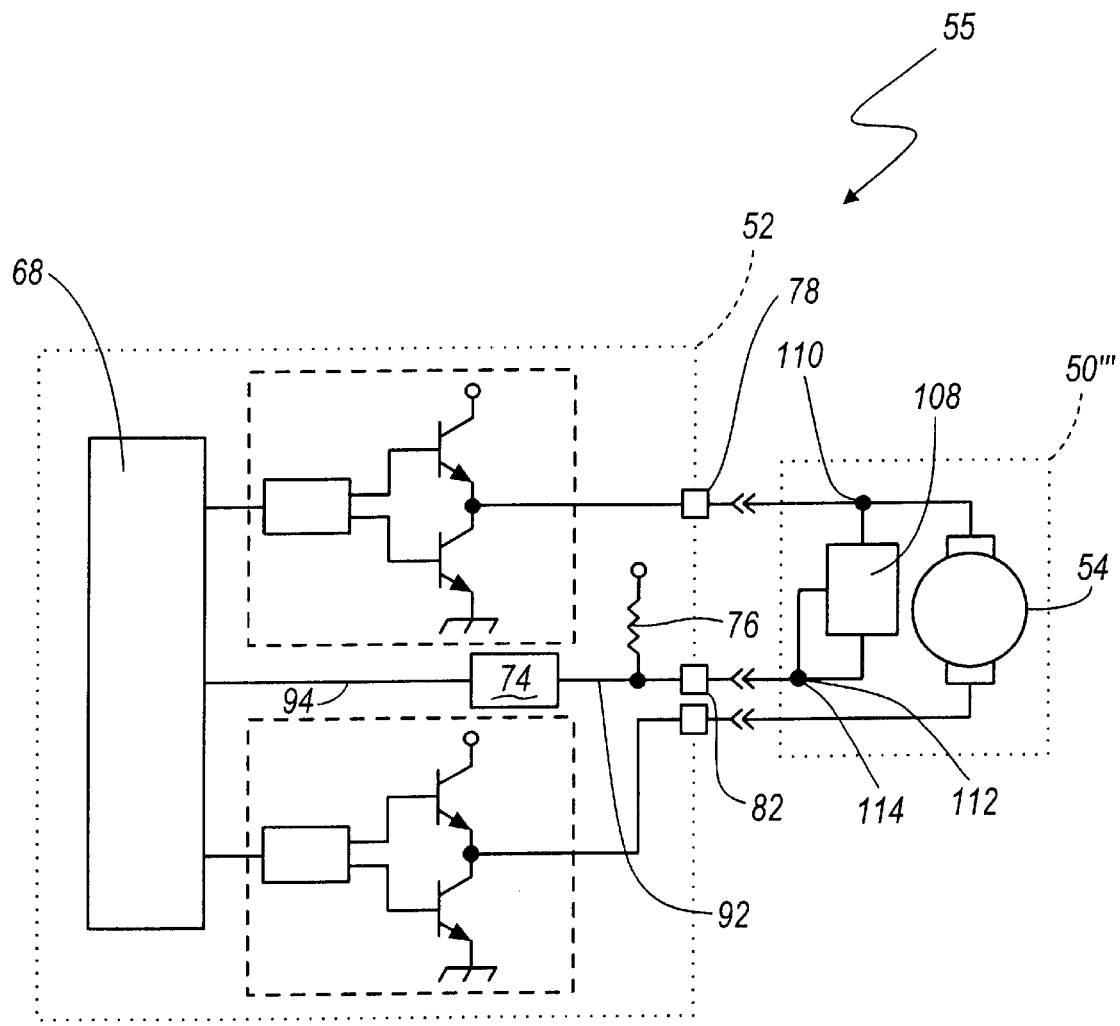
FIG. 5 is a schematic of a controller and an actuator with a feedback signal device, in accordance with the present invention.

Referring now to FIG. 5, a system 55 having an actuator 50''' and the controller 52 is shown, in accordance with the present invention. A feedback signal device 108 is shown. Feedback signal device 108 has a first feedback device end 110, a second feedback device end 112, an output feedback device end 114 and an adjustment input (not shown). First feedback device end 110 is connected to first motor drive contact 58. Second feedback device end 112 is connected to output feedback device end 114 and feedback port 82. The adjustment input is mechanically connected to the output shaft of motor 54. All other elements in this embodiment are the same as the embodiment shown in FIG. 2.

In this embodiment, to rotate the rotor of motor 54 in the first direction or in the second direction is the same as in the embodiment shown in FIG. 2. When the rotor of motor 54 rotates in the first direction or rotates in the second direction, the output shaft rotates in the same direction as the rotor in motor 54. When the output shaft rotates, the adjustment input is altered. Movement of the adjustment input changes the impedance across feedback signal device 108.

For feedback to occur, a current will flow through pull-up resistor 76 and through feedback signal device 108. The current will be able to flow from pull-up resistor 76 through feedback signal device 108 by way of feedback port 82. A voltage will be created at the feedback port 82 indicative of a position of the output shaft. The voltage will be inputted into analog input 92. Analog-to-digital converter 74 will convert the voltage into a digital signal indicative of the position of the output shaft. The digital signal will be outputted to digital output 94. The digital signal will be interpreted by processor 68.

Figure 6:
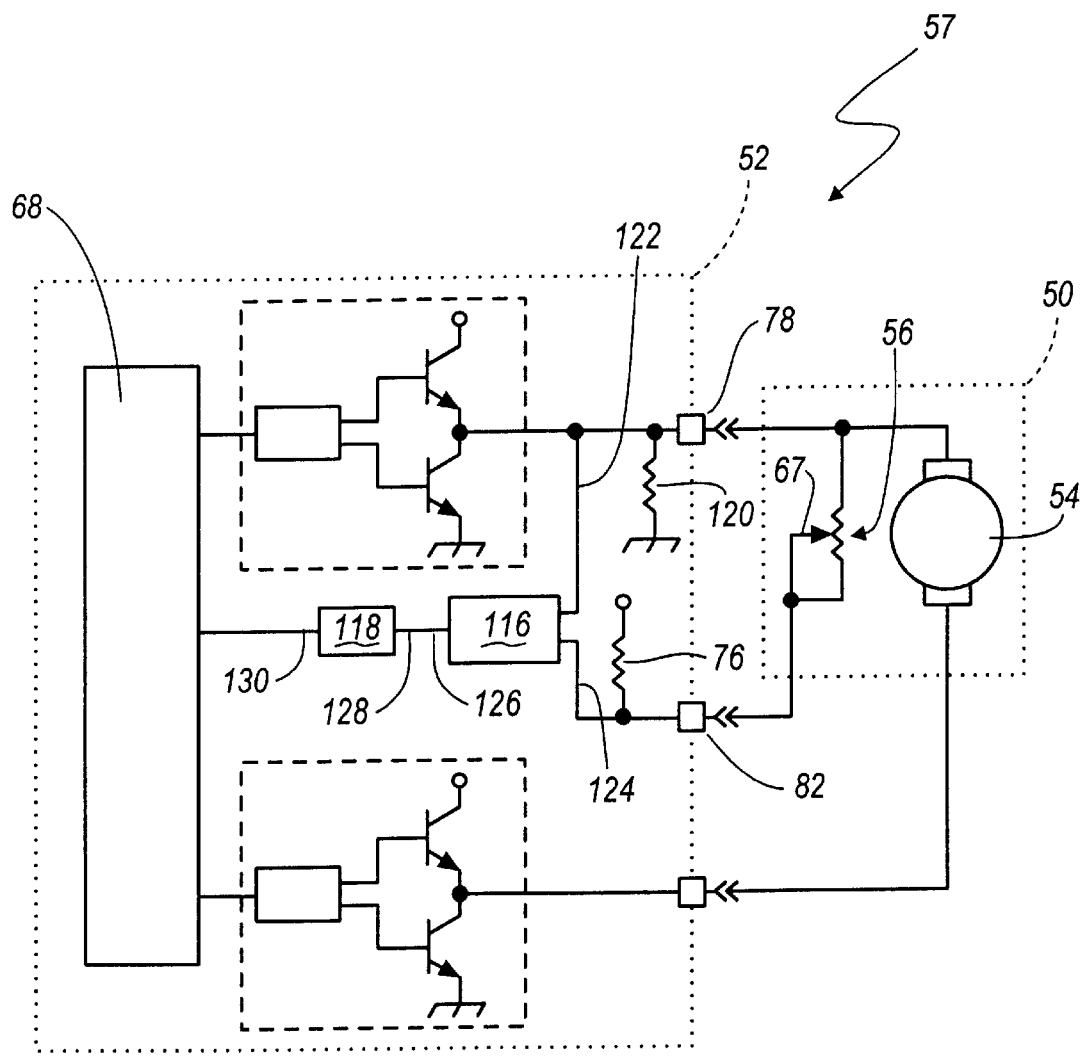
FIG. 6 is a schematic of a controller and an actuator, wherein the controller has a differential amplifier, in accordance with the present invention.

Referring now to FIG. 6, a system 57 having the actuator 50 and the controller 52 is shown, in accordance with the present invention. A differential amplifier 116, an analog-to-digital converter 118 and a pull down resistor 120 are provided. Differential amplifier 116 has a first differential input 122, a second differential input 124, and a differential output 126. Analog-to-digital converter 118 has a second analog input 128 and a second digital output 130.

First differential input 122 is connected to feedback port 82. Second differential input is connected to first motor control port 78. Differential output 126 is connected to second analog input 128. Second digital output 130 is connected to processor 68. Pull down resistor 120 is connected to first motor control port 78. All other elements in this embodiment are the same as the embodiment shown in FIG. 2.

In this embodiment, to rotate the rotor of the motor 54 in the first direction or in the second direction is the same as in the embodiment shown in FIG. 2. When the rotor of motor 54 rotates in the first direction or rotates in the second direction, the output shaft rotates in the same direction as motor 54. When the output shaft rotates, wiper 67 swipes over potentiometer 56. Movement of wiper 67 across potentiometer 56 changes the impedance of potentiometer 56.

For feedback to occur, current flows through pull-up resistor 76, potentiometer 56, and pull down resistor 120. The current flows from pull-up resistor 76 through potentiometer 56 and pull down resistor 120 by way of feedback port 82 and first motor control port 78. A first voltage is created at feedback port 82 and a second voltage is developed at first motor control port 78. Differential amplifier 116 will take the difference of the first voltage and the second voltage and output a difference voltage to differential output 126. The difference voltage is indicative of the position of the output shaft. Analog-to-digital converter 118 receives the difference voltage through second analog input 128. Analog-to-digital converter 118 outputs a digital signal indicative of the position of the output shaft to second digital output 130. Finally, the digital signal is interpreted by processor 68 to determine the location of the output shaft of motor 54.

As any person skilled in the art of actuators will recognize from the previous detailed description and from the figures and claims, modifications and changes can be made to the preferred embodiments of the invention without departing from the scope of this invention defined in the following claims.

What is claimed is:

1. A system for driving a driven member, the system comprising:
   an actuator having a motor and a potentiometer, wherein the motor has an output shaft, a first drive contact and a second drive contact, and wherein the potentiometer has a first potentiometer contact, a second potentiometer contact and a potentiometer feedback contact, wherein the first potentiometer contact is connected to one of the first drive contact, the second drive contact and a grounded contact, the second potentiometer contact is connected to the potentiometer feedback contact, thereby producing a feedback signal indicative of a position of the output shaft; and
   a controller in communication with the actuator, wherein the controller has a feedback port, a first motor control port, and a second motor control port, the feedback port is connected to the second potentiometer contact and the potentiometer feedback contact, the first motor control port is connected to the first drive contact and the second motor control port is connected to the second drive contact.

2. The system of claim 1, wherein the feedback signal is indicative of an electrical impedance.

3. The system of claim 1, wherein the first potentiometer contact is connected to the first drive contact.

4. The system of claim 1, wherein the first potentiometer contact is connected to the second drive contact.

5. The system of claim 1, wherein the first potentiometer contact is connected to the grounded contact.

6. The system of claim 1, wherein the controller further comprises a pull-up resistor connected to the feedback port.

7. The system of claim 1, wherein the controller further comprises a pull-down resistor connected to the first motor control port.

8. The system of claim 1, wherein the controller further comprises a processor.

9. The system of claim 8, wherein the controller further comprises an analog-to-digital converter, wherein the analog-to-digital converter has an analog input and a digital output, the analog input is connected to the feedback port, the digital output is connected to the processor.

10. The system of claim 9, wherein the digital-to-analog converter is integrated within the processor.

11. The system of claim 8, wherein the controller further comprises a first motor driver and a second motor driver, wherein the first motor driver has a first motor driver output and a first motor driver input and the second motor driver has a second motor driver output and a second motor driver input, the first motor driver output is connected to the first motor control port and an second motor driver output is connected to the second motor control port, the first motor driver input is connected to the processor and the second motor driver input is connected to the processor.

12. The system of claim 8, wherein the controller further comprises a differential amplifier wherein the differential amplifier has a first differential input, a second differential input and a differential output, the first differential input is connected to the feedback port, the second differential input is connected to the second motor control port.

13. The system of claim 12, wherein the controller further comprises an analog-to-digital converter, wherein the analog-to-digital converter has an analog input and a digital output, the analog input is connected to the differential output, the digital input is connected to the processor.

14. The system of claim 13, wherein the digital-to-analog converter is integrated within the processor.

15. A system for driving a driven member, the system comprising:
   an actuator having a motor and a means for producing a feedback signal, wherein the motor has an output shaft, a first drive contact and a second drive contact, and wherein the means for producing a feedback signal has a first contact, a second contact and a feedback contact, wherein the first contact is connected to one of the first drive contact, the second drive contact and a grounded contact, the second contact is connected to the feedback contact, thereby producing a feedback signal indicative of a position of the output shaft; and
   a controller in communication with the actuator, wherein the controller has a feedback port, a first motor control port, and a second motor control port, the feedback port is connected to the second contact and the feedback contact, the first motor control port is connected to the first drive contact and the second motor control port is connected to the second drive contact.

16. The system of claim 15, wherein the feedback signal is indicative of an electrical impedance.

17. The system of claim 15, wherein the first contact is connected to the first drive contact.

18. The system of claim 15, wherein the first contact is connected to the second drive contact.

19. The system of claim 15, wherein the first contact is connected to the grounded contact.

20. The system of claim 15, wherein the means for producing a feedback signal is a potentiometer.

21. The system of claim 15, wherein the means for producing a feedback signal is an integrated circuit.

22. The system of claim 15, wherein the controller further comprises a pull-up resistor connected to the feedback port.

23. The system of claim 15, wherein the controller further comprises a pull-down resistor connected to the first motor control port.

24. The system of claim 15, wherein the controller further comprises a processor.

25. The system of claim 24, wherein the controller further comprises an analog-to-digital converter, wherein the analog-to-digital converter has an analog input and a digital output, the analog input is connected to the feedback port, the digital output is connected to the processor.

26. The system of claim 25, wherein the digital-to-analog converter is integrated within the processor.

27. The system of claim 24, wherein the controller further comprises a first motor driver and a second motor driver, wherein the first motor driver has a first motor driver output and a first motor driver input and the second motor driver has a second motor driver output and a second motor driver input, the first motor driver output is connected to the first motor control port and an second motor driver output is connected to the second motor control port, the first motor driver input is connected to the processor and the second motor driver input is connected to the processor.

28. The system of claim 24, wherein the controller further comprises a differential amplifier wherein the differential amplifier has a first differential input, a second differential input and a differential output, the first differential input is connected to the feedback port, the second differential input is connected to the second motor control port.

29. The system of claim 28, wherein the controller further comprises an analog-to-digital converter, wherein the analog-to-digital converter has an analog input and a digital output, the analog input is connected to the differential output, the digital input is connected to the processor.

30. The system of claim 29, wherein the digital-to-analog converter is integrated within the processor.

\* \* \* \* \*